L. J. W. S. and C. H. McCormick,
Harvester Cutter.

No 974

Reissued. June. 5. 1860

UNITED STATES PATENT OFFICE.

C. H. McCORMICK, OF CHICAGO, ILLINOIS, ASSIGNEE OF L. J. McCORMICK, W. S. McCORMICK, AND C. H. McCORMICK.

IMPROVEMENT IN REAPING AND MOWING MACHINES.

Specification forming part of Letters Patent No. 20,212, dated May 11, 1858; Reissue No. 974, dated June 5, 1860.

DIVISION NO. 3.

*To all whom it may concern:*

Be it known that LEANDER J. McCORMICK, WILLIAM S. McCORMICK, and CYRUS H. McCORMICK, all of Chicago, in the county of Cook and State of Illinois, have invented certain new and useful Improvements in Reaping and Mowing Machines, of which the following is a full, clear, and exact description, reference being had to the accompanying drawings, making part of this specification, in which—

Figure 1:
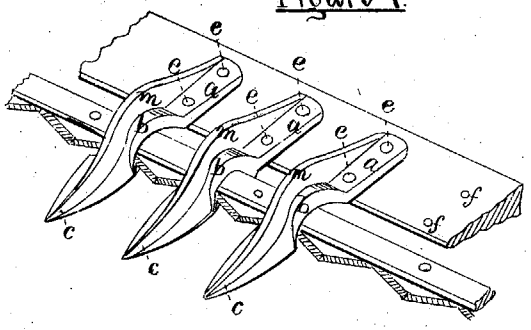
Figure 2:
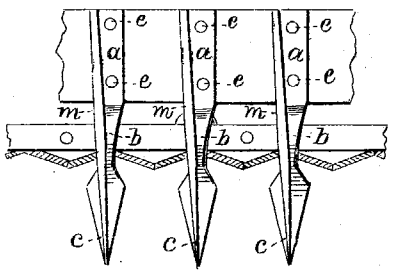

Figure 1 represents in perspective three of the improved guards or fingers attached to a fragment of one of the finger-beams, and a section of one of the sickles placed in the slots of the fingers; and Fig. 2 represents a plan of the parts shown in Fig. 1.

It is important to make the guards or fingers of a reaping and mowing machine strong and light, and it is especially important to make a finger with a strong but narrow neck and a thin shank, the former to facilitate the cutting and the clearing of obstructing matter from the cutter, the latter to admit of its being made wide enough to give it a firm seat on the finger-beam without making it too heavy, and to enable it to be fastened by shorter through bolts or rivets to the finger-beam.

The improvement which is the subject of this patent consists in constructing a guard or finger with a thin shank, a narrow neck, and with a strengthening-rib, so arranged as not to interfere with the holes for bolting the shank to the finger-beam.

In the accompanying drawings, *a* is the shank, *b* the neck, and *c* the point, of a slotted guard-finger; *e*, the holes in the shank, in which and in corresponding holes, *f*, in the finger-beam bolts or rivets are placed to unite the two. *m* is the strengthening-rib, arranged, as shown, along one side of the shank to avoid the rivet-holes, and extending diagonally forward toward the middle of the front portion of the finger, so as to pass along the neck *b* without widening it unduly. It is preferred to make the finger of cast-iron rendered malleable in the usual manner.

What is claimed under this patent as the invention of the said LEANDER J., WILLIAM S., and CYRUS H. McCORMICK is—

The guard-finger having a thin shank, a narrow neck, and a strengthening-rib, substantially as described.

In testimony whereof I have hereunto subscribed my name.

C. H. McCORMICK.

Witnesses:

ROBT. VINCENT,
D. C. JOHNSON.